F. P. STONE.
VEHICLE.
APPLICATION FILED OCT. 8, 1915.
1,355,925.
Patented Oct. 19, 1920.
2 SHEETS—SHEET 1.
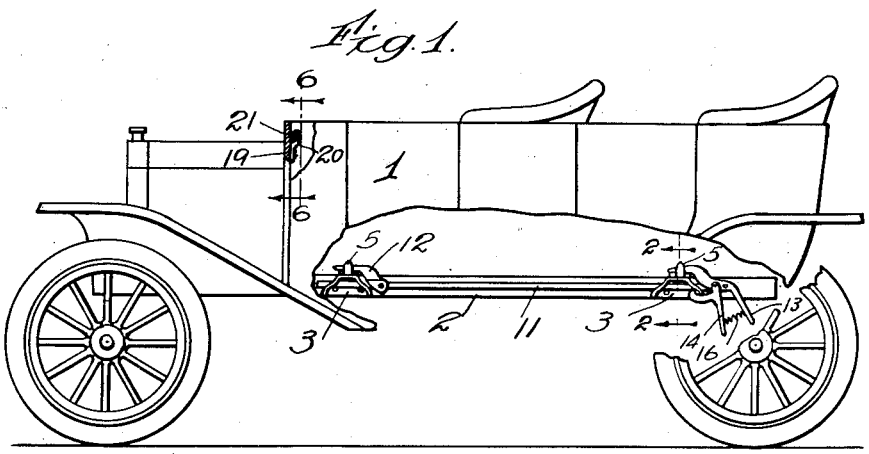
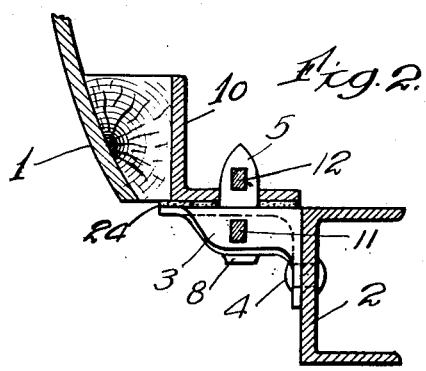
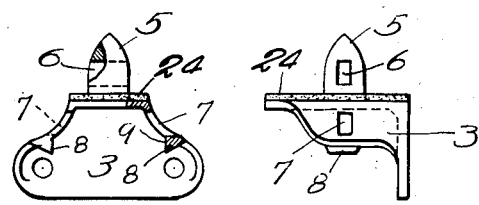
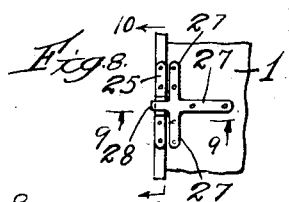
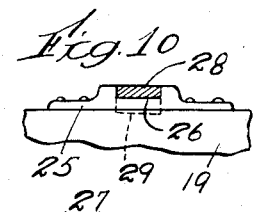
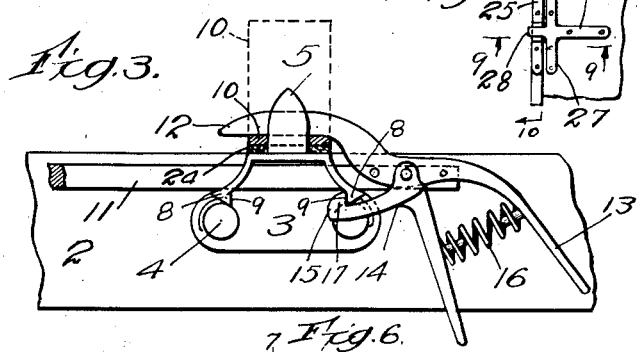
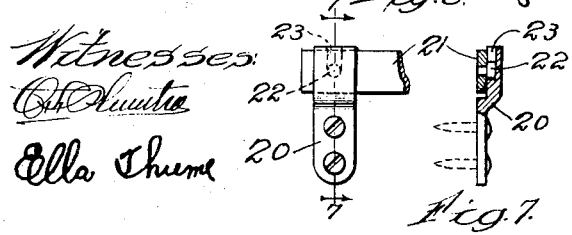
Inventor
Frank P. Stone.
by Parker & Carter
his Attys.

F. P. STONE.
VEHICLE.
APPLICATION FILED OCT. 8, 1915.
1,355,925.
Patented Oct. 19, 1920.
2 SHEETS—SHEET 2.
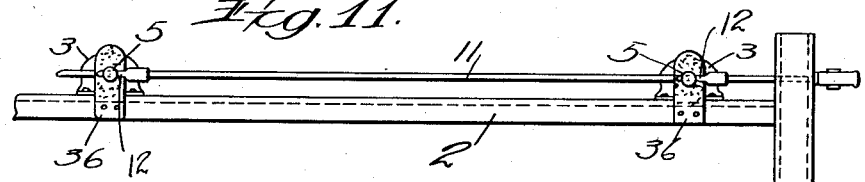
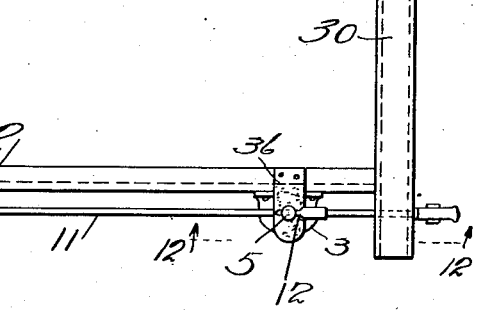
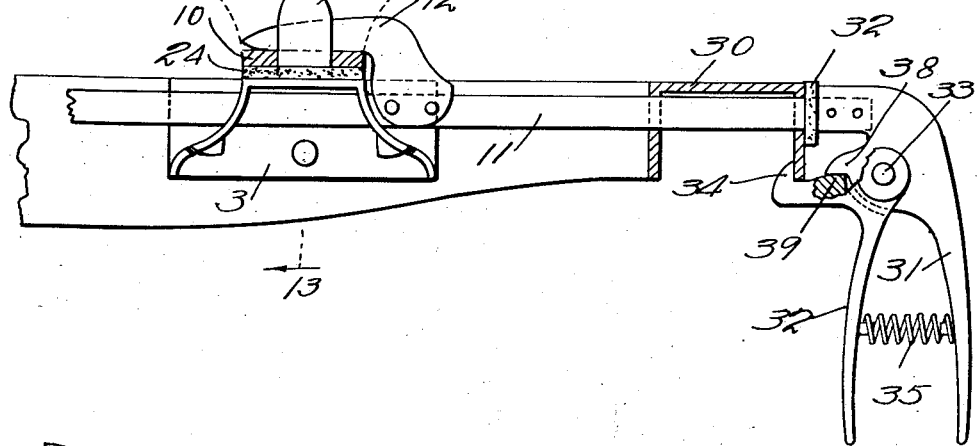
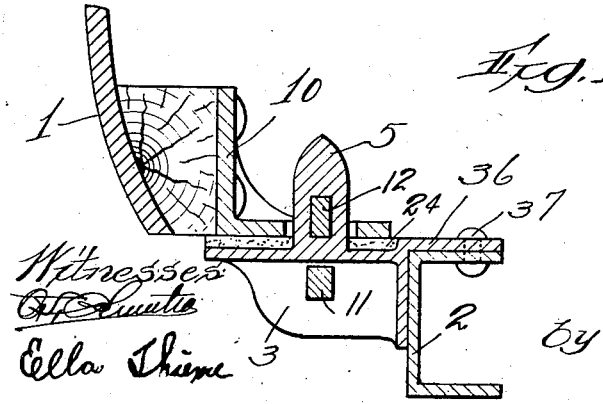
Witnesses
Inventor
Frank P. Stone,
by Parker & Carter
his Att'ys

UNITED STATES PATENT OFFICE.

FRANK P. STONE, OF CHICAGO, ILLINOIS.

VEHICLE.

1,355,925.

Specification of Letters Patent.

Patented Oct. 19, 1920.

Application filed October 8, 1915. Serial No. 54,747.

*To all whom it may concern:*

Be it known that I, FRANK P. STONE, a citizen of the United States, residing at Chicago, in the county of Cook and State of Illinois, have invented a certain new and useful Improvement in Vehicles, of which the following is a specification.

This invention relates to improvements in vehicles, and has for its object to provide a new and improved device of this description, by means of which the body of the vehicle can be easily and quickly removed and replaced by a body of another design.

The invention is illustrated in the accompanying drawings, wherein—

Figure 1 is a side elevation of a vehicle embodying my invention;

Fig. 2 is an enlarged sectional view taken on line 2—2 of Fig. 1;

Fig. 3 is an enlarged view showing the handle and clamping lever for the controlling part;

Fig. 4 is an enlarged view of one of the brackets;

Fig. 5 is a side view of the bracket shown in Fig. 4;

Fig. 6 is a sectional view taken on line 6—6 of Fig. 1;

Fig. 7 is a sectional view taken on line 7—7 of Fig. 6;

Fig. 8 is a plan view of a portion of the top of the dash-board and body showing a modified construction;

Fig. 9 is a sectional view taken on line 9—9 of Fig. 8;

Fig. 10 is a sectional view taken on line 10—10 of Fig. 8;

Fig. 11 is a plan view showing a modified construction;

Fig. 12 is an enlarged sectional view taken on line 12—12 of Fig. 11;

Fig. 13 is a sectional view taken on line 13—13 of Fig. 12.

Like numerals refer to like parts throughout the several figures.

Referring now to the drawings, wherein I have shown one form of my invention, the body 1 is removably connected with the frame or chassis 2, having side pieces, so that it may be easily and quickly removed and replaced. In the construction shown, I provide at each side of the chassis a plurality of engaging devices or brackets 3, there being two or more brackets on each side properly spaced apart. If there are two brackets they are placed one near each end of the frame. The brackets 3 are fastened to the side pieces 2 in any desired manner, as by means of bolts 4. These brackets are provided with projections 5 having holes 6 therethrough, and the brackets themselves have holes 7 extending therethrough, the wall of the brackets at the bottom of said holes being thickened as shown at 8, and having a face 9 adapted to be clamped by a clamping device hereinafter described. Connected with the body 1 are coöperating engaging devices or brackets 10 which coöperate with the engaging devices or brackets 3 and which preferably consist of angle pieces, one angle being fastened to the body portion in any desired manner, and the other angle having an opening through which the projection 5 projects. When the body is in place, the engaging pieces or brackets 10 rest upon the engaging pieces or brackets 3, the projections 5 extending through holes in the parts 10 and projecting above said parts so that the holes 6 in the projections 5 are either wholly or partly above the bases of the brackets 10 through which they pass. A controlling part or bar 11 extends from one bracket to another and passes loosely through the openings 7 therein (see Fig. 2). Connected with the controlling part or bar are the locking pieces 12, the ends thereof being in proper position to pass into the opening 6 in the projections 5 when the controlling part is moved longitudinally. This controlling part is preferably provided with a handle 13, by means of which it can be readily moved. It will be seen that when the controlling part is moved forward, the locking parts 12 pass into the opening 6 of the projections 5 and lock the two engaging parts or brackets 3 and 10 together, thereby fastening the body to the frame. Some suitable means is provided for holding said controlling part against movement so that the body cannot become accidentally disengaged from the frame. As herein shown, I provide a clamping part or lever 14, which is preferably pivoted to the handle 13 so that it may be grasped when the handle is grasped. This clamping part is provided with an engaging projection 15, which engages the face 9 of the bracket 3 (see Fig. 3), and holds the controlling part against longitudinal movement. This clamping part is preferably provided with a controlling spring 16, which normally holds the projection 17 in its clamping position. When the handle and the part 14 are grasped, the part 14 may be moved to compress the spring and release the clamping part 15 from the face 9. The controlling part or bar 11 can then be moved longitudinally so as to move the locking parts 12 out of the openings 6, thereby unlocking the body from the frame. The body can then be lifted from the frame and a body of a different design having engaging parts or brackets 10 connected thereto can be easily and quickly placed upon the frame so that the projections 5 project through the brackets 10. The controlling part or bar 11 is then moved so as to move the locking pieces 12 into the openings 6 and thereby lock the body and frame together. When the handle and the part 14 are released, the spring 16 moves the clamping projection 15 so as to cause it to engage the face 9 and lock the controlling part against movement. There are at least two of these controlling parts, one at each side of the frame, and it is only necessary to move these two controlling parts longitudinally to either unlock or lock the body to the frame. It will thus be seen that by means of this invention the body can be quickly and easily removed from the frame and another body quickly and easily placed thereon and locked in position.

By means of this invention, the owner of a single chassis of an automobile can have bodies of different designs, such as a limousine and delivery body and a touring body and the like, and he can easily and quickly remove any of these bodies and place another body therein, thus greatly extending the use of the one chassis. A chassis, for example, may be used during the daytime with a delivery body thereon, to deliver goods; in the evening and on Sundays the delivery body can be removed and some suitable form of passenger carrying body placed thereon, and this can be done so quickly and easily that it is no more difficult than hitching horses to different vehicles. I may provide some additional means for preventing lateral movement of the body, such means being arranged so that it does not interfere with the easy removal and replacement of the bodies. In the construction of Figs. 6 and 7, I provide this means by attaching at each side to the dash or instrument board 19 the holding piece 20. A brace 21 is connected with the body, said brace being provided with a projecting part 22, which fits in a groove 23 in the holding piece 20, the groove being open at the top so that when the body is lifted or lowered the two parts are disconnected. The projecting part 22 may be the head of a rivet or bolt attached to the brace 21. It will thus be seen that when the body is lowered into position the brace 21 is connected with the holding part 20 so as to resist lateral movement of the body and yet not interfere with the easy removal of the body. If desired, a gasket 24, of suitable material such as canvas, rubber, leather or the like, may be placed on the brackets 3 so as to be interposed between said brackets and engaging devices or brackets 10, thereby making the device self-adjusting for irregularities in the placing of the brackets, or due to warping of the body and the like.

In Figs. 8, 9 and 10 I have shown a modified construction associated with the dash or instrument board for preventing both lateral and back and forth motion. In this construction the dash or instrument board 19 is provided with the engaging device 25, which may be a metal piece fastened thereto, said metal piece having a slot or groove 26 open at the top. Connected with the body 1 is another engaging device 27 fastened thereto in any desired manner, the forward portion 28 thereof entering the slot as shown in said figures. This forward portion also has the projections 29, which extend to the front and rear of the engaging device 25, which projections prevent back and forward movement of the body with relation to the frame. The forward end 28 when in the slot or groove 26 prevents lateral movement of the body with relation to the frame. This construction, as well as the construction shown in Figs. 6 and 7, showing the interlocking engaging devices, relieves the strain on the brackets 3 and 10 and associated parts. In some constructions of the chassis, the arrangement shown in Figs. 1 and 3 cannot be used. As illustrated, for example, in Fig. 11, the side pieces 2 are connected together at their rear ends by the end piece 30, which may be of any desired shape and which, as herein shown, is a channel iron. This end piece projects beyond the side pieces, as shown, and would interfere with the movement of the controlling parts or bars 11 and the controlling and locking pieces. In this construction, therefore, the bars or controlling parts 11 are longer than as shown in Fig. 1, and pass through openings in the end piece 30, as shown in Figs. 11 and 12. A handle piece 31 is connected with each bar 11 and is preferably provided with a non-metallic piece 32 adapted to strike said cross-piece when the locking pieces 12 are in their locking position. A clamping lever 32 is pivoted at 33 to the handle 31 and is provided with a projection 34 which engages the cross-piece 30 (see Fig. 12), the spring 35 normally holding this projection in its engaging position. The non-metallic piece 32 prevents rattling of the parts and insures a tight contact with the cross-piece 30. In this case each bar 11 has a plurality of locking pieces 12, which pass through openings in the projections 5 on the brackets 3 attached to the frame pieces 2. In the construction shown, the brackets 3 are provided with fastening pieces 36 which pass on top of the side pieces 2 and are fastened thereto in any desired manner, as by means of bolts 37 (see Figs. 1 and 13). The projections 5 on the brackets 3 pass through openings in the brackets 10 on the body 1, this construction being similar to that shown in Figs. 1 and 2. In this construction the body is removed and replaced in the same manner as described in connection with Fig. 1, the difference being that the handle device and projection connected therewith engages the end piece 30 instead of one of the brackets 3. When it is desired to move the locking pieces 12 from the projections 5, the handle 31 and lever 32 are grasped so as to release the projection 34 from the end piece 30, whereupon the controlling piece 11 may be pulled outwardly so as to disengage the locking pieces 12 from the projections 5, and this permits the brackets 10 and 3 to be separated and the body removed from the chassis. The handle 31 is preferably provided with a projection 38, which is engaged by a part 39 on the lever 32 when the parts are out of their operative position, so as to limit the movement of the lever 32.

I have described in detail a particular construction embodying my invention, but it is of course evident that the parts may be varied in many particulars, and I therefore do not limit myself to the particular construction shown.

I claim:

1. A vehicle comprising a frame, a body, a plurality of engaging devices separate from the frame and body but attached thereto, one set of engaging devices provided with projections which project through openings in the other engaging devices, locking devices adapted to be passed through openings in said projections to lock the two sets of engaging devices together, and a controlling part for said locking devices, the controlling part and locking devices separated by a space through a portion of their length, and means for holding said controlling part in position to hold said locking devices in their locking position.

2. A vehicle comprising a frame, a body, a plurality of engaging devices on the frame and on the body, one set of engaging devices provided with projections which project through openings in the other engaging devices, locking devices adapted to be passed through openings in said projections to lock the two sets of engaging devices together, and a controlling part for said locking devices, said controlling part passing through openings in the engaging devices provided with said projections.

3. A vehicle comprising a frame, a body, a plurality of engaging devices separate from the frame and body but attached thereto, one set of engaging devices provided with projections which project through openings in the other engaging devices, locking devices adapted to be passed through openings in said projections to lock the two sets of engaging devices together, a longitudinally movable controlling part for said locking devices, and means for holding said controlling part against longitudinal movement when in a predetermined position, and means for locking said controlling part when in a predetermined position.

4. A vehicle comprising a frame, a body, a plurality of engaging devices on the frame and on the body, one set of engaging devices provided with projections which project through openings in the other engaging devices, locking devices adapted to be passed through openings in said projections to lock the two sets of engaging devices together, a controlling part for said locking devices, said controlling part passing through openings in the engaging devices provided with said projections, and a clamping device connected with said controlling part and adapted to engage one of said engaging parts so as to hold the controlling part against movement.

5. A vehicle comprising a body, a frame, two sets of engaging devices, one connected with the body and the other with the frame, one set of engaging devices provided with projections which project through the other set of engaging devices, said projections provided with openings, the engaging devices with which the projections are connected also provided with openings, a controlling part passing through said latter openings, locking parts connected with said controlling part and having free ends adapted to pass through the openings in said projections so as to lock the two sets of engaging devices together.

6. A vehicle comprising a body, a frame, two sets of engaging devices, one connected with the body and the other with the frame, one set of engaging devices provided with projections which project through the other set of engaging devices, said projections provided with openings, the engaging devices with which the projections are connected also provided with openings, a controlling part passing through said latter openings, locking parts connected with said controlling part and having free ends adapted to pass through the openings in said projections so as to lock the two sets of engaging devices together, and means for holding said controlling part against movement.

7. A vehicle comprising a body, a frame, two sets of engaging devices, one connected with the body and the other with the frame, one set of engaging devices provided with projections which project through the other set of engaging devices, said projections provided with openings, the engaging devices with which the projections are connected also provided with openings, a controlling part passing through said latter openings, locking parts connected with said controlling part and having free ends adapted to pass through the openings in said projections so as to lock the two sets of engaging devices together, a handle connected to said controlling part, and a clamping lever pivotally connected with said controlling part and adapted to engage one of said engaging parts so as to hold the controlling part against movement with relation thereto.

8. A vehicle comprising a frame, a body, a plurality of engaging devices on the frame separate therefrom but attached thereto, a plurality of opposed engaging devices on the body separate therefrom but attached thereto, one set of engaging devices provided with projections which project through openings in the other engaging devices, locking devices adapted to be passed through openings in said projections to lock the two sets of engaging devices together, a controlling part for said locking devices, by means of which they may be moved to their unlocking position so that the body may be lifted from the frame, and separate engaging devices on the frame and body for preventing relative lateral movement between them, said latter engaging devices being engaged and disengaged by lowering or lifting the body from the frame.

9. A vehicle comprising a frame, a body, a plurality of engaging devices on the frame separate therefrom but attached thereto, a plurality of opposed engaging devices on the body separate therefrom but attached thereto, one set of engaging devices provided with projections which project through openings in the other engaging devices, locking devices adapted to be passed through openings in said projections to lock the two sets of engaging devices together, a controlling part for said locking devices, by means of which they may be moved to their unlocking position so that the body may be lifted from the frame, and separate engaging devices on the frame and body for preventing relative lateral movement between them, said latter engaging devices comprising two parts, one provided with an open groove into which the other is received when the body is lowered into position on the frame.

10. A vehicle comprising a frame, a body, engaging devices on the frame and body, longitudinally movable means for locking and unlocking said engaging devices so that the body may be locked to or removed from the frame, and separate interlocking engaging devices on the frame and body adapted to limit the relative movement of the body and frame, and a controllable lock for locking said longitudinally movable means against longitudinal movement when in its locking position.

In testimony whereof, I affix my signature in the presence of two witnesses this 21st day of September, 1915.

FRANK P. STONE.

Witnesses:
ESTHER VAN FRANK,
ELLA THIEME.